United States Patent
White

(10) Patent No.: US 6,839,481 B2
(45) Date of Patent: Jan. 4, 2005

(54) HIGH-CAPACITY MULTIMODE OPTICAL FIBER SYSTEMS

(75) Inventor: Ian A. White, Dunwoody, GA (US)

(73) Assignee: Fitel USA Corp., Norcross, GA (US)

( * ) Notice: Subject to any disclaimer, the term of this patent is extended or adjusted under 35 U.S.C. 154(b) by 83 days.

(21) Appl. No.: 10/407,410

(22) Filed: Apr. 4, 2003

(65) Prior Publication Data

US 2004/0197048 A1 Oct. 7, 2004

(51) Int. Cl.$^7$ .............................................. G02B 6/28
(52) U.S. Cl. ......................... 385/24; 385/37; 385/28; 385/29; 385/123
(58) Field of Search ........................... 385/24, 27–29, 385/123–127, 37

(56) References Cited

U.S. PATENT DOCUMENTS

| | | | |
|---|---|---|---|
| 3,966,446 A | 6/1976 | Miller | |
| 4,038,062 A | 7/1977 | Presby | |
| 5,867,616 A | * 2/1999 | Antos et al. | 385/11 |
| 6,131,415 A | 10/2000 | Chang | |
| 6,205,268 B1 | 3/2001 | Chraplyvy | |
| 6,415,079 B1 | * 7/2002 | Burdge et al. | 385/37 |
| 2003/0012498 A1 | * 1/2003 | Ohmura et al. | 385/37 |

OTHER PUBLICATIONS

A. King, et al., *10 Gb/s Ultra–long haul transmission on a common all–Raman single–wideband platform*, 28$^{th}$ Eur. Conf. on Opt. Comm, 2002, paper 1.1.1.

* cited by examiner

*Primary Examiner*—Hemang Sanghavi

(57) ABSTRACT

Multimode optical fiber local area networks, both intrabuilding and interbuilding, are optimized to take advantage of the wide wavelength operating range offered by co-pending patent application Ser. No. 10/408,076 "Enhanced Multimode Fiber" —a fiber provided both with: longitudinally spaced perturbations for inducing mode coupling and thereby lessening mode dispersion; and with a radial discontinuity for discouraging conversion of bound-to-cladding-modes and thereby lessening added loss previously associated with induced mode coupling.

13 Claims, 2 Drawing Sheets

HIGH-CAPACITY MULTIMODE OPTICAL FIBER SYSTEMS

FIELD OF THE INVENTION

The field addressed concerns short and medium distance optical fiber communication systems based on multimode fiber—local area network (LAN) systems, both intrabuilding with system lengths characteristically up to 500 meters, and interbuilding with system lengths of up to approximately 10 kilometers (km).

DESCRIPTION OF THE PRIOR ART

Continued dominance of single-mode fiber for long-distance fiber communications is assured. Device development has kept pace with fiber, resulting in DWDM systems with per-fiber capacity of a terabit/sec. See, e.g., A. Kung, et al., "10 Gb/s and 40 Gb/s Ultra-long haul transmission on a common all-Raman single-wideband platform," $28^{th}$ European Conference on Optical Communications, paper 1.1.1, Copenhagen, Denmark, Sep. 8–12, 2002. Operation at system wavelength of 1310 nanometers (nm) has largely yielded to operation at 1550 nm. Recent work in reducing the water peak responsible for increased loss at system wavelengths between the two silica transparency windows will permit operation over the entire band (see, e.g., U.S. Pat. No. 6,131,415, issued Oct. 17, 2000, and U.S. Pat. No. 6,205,268, issued Mar. 20, 2001).

Relatively unheralded, multimode operation continues to be the choice for shorter distance (e.g., ≦10 km) communications. Background to the present invention is described in the Aug. 24, 1999, press announcement in which Lucent Technologies Inc. announced its LazrSPEED® fiber optic cabling solution for Local Area Network (LAN) systems. The announcement proclaimed continuing viability for multimode fiber—in which improved per-channel capacity, together with multi-channel operation, translates into a niche position in a technology generally dominated by single-mode fiber. Making use of near-two alpha profiled fiber, the announced advance promised satisfaction of needs for present and future LAN systems. Such systems importantly operating at 850 nm with associated economies, e.g., in component cost, offer 3-channel, 10 gbit/channel operation—this capacity based on (fiber-limited) 840–860 nm bandwidth and (component-limited) 10 nm Coarse Wavelength Division Multiplexing (CWDM) channel spacing. For 1 gigabit/sec (Gb/s) channels, the range of operating wavelengths allowable is from 760–860 nm allowing for 11 channels of 10 nm channel-to-channel spacing.

The LazrSPEED announcement, while describing that niche use, acknowledges a shortcoming of conventional multimode fiber. Growing need for higher bandwidth would not be satisfied because of mode dispersion. The source of the problem is understood—has precluded use of multimode fiber in long distance systems. Fiber defects, introduced into the fiber during manufacture, act as scattering centers, causing mode conversion so that light pulses, single-mode as introduced, are constituted of many modes as received. Differing group velocities for the different modes cause pulse spreading, thereby lowering permitted pulse-repetition rate and limiting capacity. State-of-the-art multimode fiber side-steps the problem by its $\alpha=2$ profiled core, which sufficiently equalizes group-velocities for the different modes, over shorter LAN distances, for its 840–860 nm bandwidth. For longer distances or greater bandwidth, it is necessary to address the scattering problem.

An effort of the 1970's, directed toward increased multimode fiber capacity, promised to remedy the scattering problem. U.S. Pat. No. 3,966,446, issued Jun. 29, 1976, is representative of that effort. The approach is to supplement the fiber defects—to increase the number of mode conversion centers so as to assure that each photon, as received, had undergone conversion to all permitted modes—effectively to "average" group velocities. The explicit method depended on "material perturbations"—on changes in effective index-of-refraction, due to compositional changes introduced into the preform, with resulting perturbations retained in the subsequently-drawn fiber. Later work by H. M. Presby substituted "geometric perturbations"—changes in cross-section introduced into the already drawn fiber (U.S. Pat. No. 4,038,062, issued Jul. 26, 1977). Unfortunately, regardless of the type of perturbation, improvement in bandwidth was invariably accompanied by added fiber loss. The effort has been largely discontinued.

Systems of the present application continue to use alpha-profiled, multimode fiber, now index-perturbed for further reduced mode dispersion, and, importantly, with little or none of the added loss associated with mode-mixing. That fiber, known as "Enhanced Multimode Fiber" (or "EMF"), is claimed and fully described in the co-pending patent application "Enhanced Multimode Fiber," Ser. No. 10/408, 076, filed on even date herewith and assigned to the assignee of this application, and which is hereby incorporated by reference.

Claimed subject matter in this co-pending patent application supplements the velocity-equalizing effect of the alpha profiled core by means of perturbation-induced mode-mixing. The new fiber depends on longitudinal perturbations for mode conversion, much in the manner of U.S. Pat. No. 3,966,446, but, in addition, provides for lessening the generally associated increased fiber loss. The inventor recognized the source of that added loss—induced coupling between a bound mode and a cladding mode, accompanying the intended coupling between supported modes. The same perturbations responsible for reduced mode dispersion, promoted conversion of some fraction of its information-carrying pulse stream to cladding mode—to energy which, by definition, not supported, would lead to loss by radiation. This was the origin of the "added loss" plaguing the perturbation approach.

Now appreciating a behavioral difference between photons of different mode order—of radial location of energy concentration at successively increasing radial distance from the center of the fiber for photons of successively increasing mode order, the inventor introduces an index "discontinuity" in the otherwise smoothly-decreasing, alpha-profile refractive index of the core. Of lesser index than that dictated by extrapolation of the index of the inner, alpha-profile, core—consisting of an annular region of index at least 5% Δ less than resulting from continuation of the inner core profile.

An embodiment of the present invention is based on use of an EMF species providing particular assurance of decoupling of radiation modes. In that fiber, the discontinuity is enclosed within an outer core region of radial extent at least 10% of the, now three-part core (as constituted of: 1. inner core region; 2. discontinuity; 3. outer core region). The tradeoff—assured decoupling of radiation modes at cost of energy loss associated with the highest core modes(s)—is responsible for the permitted broadened bandwidth and consequent increased capacity (as enabled by larger WDM channel sets), together serving for the 100 gigabit/fiber capacity of embodiments of the present invention.

To large extent, reliance is had on the co-pending patent application Ser. No. 10/408,076 "Enhanced Multimode Fiber" for detailed description of the EMF design solution. This is thought justified in view of the level of development of the optical fiber art, in which the expert is familiar with function and design of aspects: the perturbation stream for promoting mode mixing; the "α profile" and its function in lessening difference in group velocity for different modes; together with its usually-preferred "α=2 profile" value; and including generally accepted approximations, "best-fit α profile" and "near-2 α profile." In consistent fashion, the following section is primarily concerned with term definitions relating to claimed system usage—depends on standard texts (e.g., A. H. Cherin, *An Introduction to Optical Fibers*) and on the co-pending patent application Ser. No. 10/408,076 for definitions concerned with the fiber, itself.

Terminology

Simplex system—System providing separate and distinct optical fibers for each of the communication directions.

Duplex system—System providing for bi-directional signal transmission on a single fiber.

Diplex system—Duplex system providing for different carrier wavelengths for the two transmission directions.

WDM—Wavelength Division Multiplex system providing for two or more channels of differing wavelengths on a single fiber.

CWDM—Coarse Wavelength Division Multiplex system in which wavelengths of member channels differ by at least 10 nm.

DWDM—Dense Wavelength Division Multiplex system in which wavelengths of member channels differ by less than 10 nm.

MMF—Multimode Fiber—fiber of core size sufficient to support a plurality of bound modes—characteristically from several hundred to 2,000 modes, including the fundamental mode.

EMF—Enhanced Multimode Fiber—the multimode fiber claimed in the co-pending patent application Ser. No. 10/408,076 "Enhanced Multimode Fiber" —perturbed, "alpha-profiled", multimode fiber in which core profiling is interrupted by a discontinuity in value of index-of-refraction and of radial position, to, directly or indirectly, impede mode conversion of a bound mode to a cladding mode.

Adapted from claim language used in this co-pending patent application, EMF is defined as optical fiber suitable for multimode operation at a system operating wavelength in the wavelength range of 770–1700 nm, the fiber including a core and a cladding and having a guide strength, $\Delta$, the core including a first core portion having a continuous relationship between value of refractive index and radial position such that the maximum change in index over a radial distance of 2 $\mu$m is less than 5% $\Delta$, with all wavelength-dependent values determined at a wavelength of 850 nm as measured in free space, in which all radius-dependent values of index of refraction disregard deviations extending radially for distance of less than 850 nm, and in which the fiber includes a plurality of spaced perturbations, each perturbation constituting an interruption in fiber transmission properties for at least one bound mode in the core, the first core portion being enclosed within a second core portion, of radial extent of at least 10% of that of the core, within which values of index of refraction are at least 5% $\Delta$ less than extrapolated values prescribed by extension of the said continuous relationship.

LAN—Local Area Network—Without further description, the term is intended to embrace other than long-distance systems (intrabuilding systems having fiber spans$\leq$500 meters, as well as so-called "campus" or "enterprise" interbuilding systems having fiber spans>500 meters, likely of 1–10 km)—together prescribing systems with fiber spans generally $\leq$10 km.

Extreme Channels—The two WDM member channels of greatest wavelength separation—generally, but not necessarily embracing one or more additional channels, together constituting the WDM channel set.

850 nm, 1310 nm, 1550 nm—Nominal wavelength values, designating operation at a system wavelength within the associated wavelength range (defining suitable wavelength ranges of operation within a high-transparency region of the high-silica material of which optical fiber is commonly constituted)—ranges, which while not rigidly definable, are considered: 770–880 nm; 1260–1360 nm; 1480–1580 nm, respectably.

SUMMARY OF THE INVENTION

WDM Local Area Network Systems, with transmission over Enhanced Multimode Fiber (EMF), while realizing attributes of LazrWAVE™ systems, gain from further operational and cost advantages. Included systems, in providing for operation at nominal system wavelength of 850 nm, still satisfy a primary driving force responsible for continuing interest in multimode systems. At the same time, of benefit both in intrabuilding use and in longer-distance LANs—in "Enterprise" or "Campus" systems—included systems may provide for operation at less lossy longer wavelengths, thereby enabling expedient, high-capacity operation over longer transmission distances as well. Such systems, of operating wavelengths ordinarily the province of single-mode systems, may avoid need for frequency-conversion, thereby facilitating interconnection with single-mode long distance systems. At the same time, use of multimode fiber continues to expedite connection with intrabuilding LAN's operating at system wavelength of 850 nm.

Included systems depend on transmission over Enhanced Multimode Fiber. That fiber—with its perturbation-induced high bandwidth; with its lessened added loss (in the past, associated with the perturbation stream); and with its broad available wavelength range of operation—in accordance with embodiments of the invention, permits systems of greater information capacity than previously realizable with use of multimode fiber.

In broadest terms, described as any system based on use of EMF, economic considerations are expected to dictate provision for a threshold value of information capacity—for a value not expeditiously attained with prior-art multimode fiber (e.g., with LazrWAVE™ fiber). Discussion generally contemplates such systems, with provision for 850 nm, 100 gigabit/fiber operation. Conceivably, single-channel preferred systems are, however, WDM, with extreme channels of the WDM channel set at wavelength spacing of at least 25 nm. Systems, as-installed or with future upgrading, may provide for: larger channel sets (with additional channel(s) embraced within extreme members); operation at other system wavelength; Duplex as well as Simplex operation.

Included systems provide for WDM operation with channel-to-channel separation of at least 10 nm—generally referred to as Coarse WDM ("CWDM"). Such broad separation is readily enabled by the very extensive bandwidth range of EMF. Taking advantage of economies resulting from CWDM separation, such systems may provide for operation with the wavelengths of the extreme channels of the WDM set separated by $\geq$100 nm or even $\geq$300 nm. Capacity of such a CWDM system, using state of the art, commercially available components, may compete with state-of-the-art single-mode systems—may have total per-fiber capacity of 100 gigabit or greater. Broad available bandwidth of EMF, in permitting broad wavelength separation between oppositely-directed channels, is put to advantage in expedient Diplex system design.

As with LazrWAVE, initial systems are expected to be intrabuilding, providing for 850 nm operation. These will likely be followed by longer-distance enterprise systems with operation at system wavelengths now associated with single-mode systems. "All-Wave" operation, over the entire spectrum, including 1310 nm as well as 1550 nm, is possible in accordance with the principles of U.S. Pat. No. 6,131,415 issued Oct. 17, 2000 and U.S. Pat. No. 6,205,268 issued Mar. 20, 2001.

DETAILED DESCRIPTION

1. General

Figure 1:
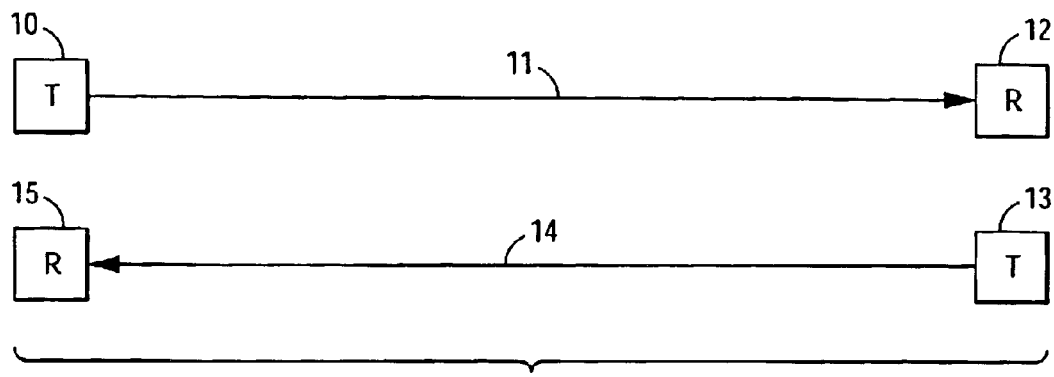
FIG. 1 is a schematic diagram of a single-channel Simplex system—accordingly with separate fibers for the two communication directions.

The invention takes advantage of operating capabilities generally associated with multimode fiber, with its many economies—with significant cost saving in circuit elements and in installation. LAN systems of the invention, like most now in use, continue to provide for operation at the nominal system wavelength, $\lambda_s$=850 nm. Improved capabilities offered by EMF—notably increased wavelength range of operation—translate, as well, into practical multimode operation in the low-loss 1310 nm and 1550 nm transparency regions of silica-based fiber. CWDM capacities, for channel sets of broad (many nanometer) channel-to-channel separation, offer niche uses with cost advantage over DWDM single-mode systems (which are dependent on closer channel-separation and, in consequence, on more costly circuit components).

2. The Fiber

Systems make use of the enhanced multimode fiber (EMF) of the co-pending patent application Ser. No. 10/408,076 "Enhanced Multimode Fiber". EMF depends on perturbations for reducing mode dispersion—also avoids the added loss, in the past associated with perturbed fiber. EMF accomplishes this by lessening radiation loss—this by providing a "discontinuity" in the otherwise smooth radial progression of index-of-refraction values in the core cross-section, thereby restricting conversion of bound to cladding modes and minimizing associated radiation loss.

Expeditious perturbation-induced mode-coupling complements the a profiled core, the latter adopted from the prior-art LazrWAVE fiber, so that profiling and perturbations, together, cooperate to maximize bandwidth. Advantages realized continue from usual 850 nm operation into the 1310 nm and 1550 nm silica transparency windows. An advance, usefully implemented in fabrication of single mode fiber, may be applied to the multimode fiber herein for maximizing wavelength range. The "All Wave" fiber solution, previously noted, with its elimination of the silica "water peak", centered about 1385 nm, is valuably applied to further enlarge the already extensive operating wavelength range of the EMF.

3. Consequent Operating Range

Design principles of the invention are not wavelength specific. While it is expected as-installed systems will provide for 850 nm operation, they may provide, as well, for operation at any of the usual single-mode-operating wavelengths of 1310 nm and 1550 nm, or intermediate values. A total $\lambda_s$ range of from 770–1700 nm is, accordingly, contemplated.

Greatest impact is expected to be for Coarse Wavelength Division Multiplex operation, which, now, largely due to substantially broadened operating bandwidth, may rival state-of-the-art single mode DWDM systems. Ordinarily considered, capacity of CWDM has been quite restricted because of needed channel-to-channel spacing well in excess of the usual $\leqq 1.0$ nm separation of DWDM. With the present systems, bandwidth of 100 gigabit or greater, permits operation with 10 or more channel sets at usual $\geqq 10$ nm separation.

4. The System

Near-term use may consist largely of systems in which LazrWAVE fiber is replaced by EMF—with advantage taken of improved capability only upon future upgrading. Such systems may operate in accordance with any of those described in conjunction with FIGS. 1 through 4 over intrabuilding distances of up to about 500 meters. At this time, that improved capability is, meaningfully described as permitting per-fiber capacity of $\geqq 100$ gigabit—likely in 10-channel, 10 gigabit/channel, WDM operation. The same capability permits bidirectional operation, with the same total capacity—e.g., in Duplex systems, either with TDM or WDM differentiating the two transmission directions. State-of-the-art design/practice, now applied to the EMF-based systems, readily enable upgrading. By the same token, operation at less than maximum permitted capacity may result in economic advantage, since, for given number of channels, wavelength spacings of CWDM may be increased to occupy higher bandwidth capability of EMF, with further reduced demand on, and consequently cost of, sources and multiplexing/demultiplexing system components. A typical LAN intrabuilding system has a length of 500 meters or less and, as initially installed, may have a total system capacity of 1 gigabit/sec. It is anticipated that capacity requirement may increase to 10 gigabit/sec in the near future and to 100 gigabit in the longer term. Over these distances, loss is not a primary design limitation. This is a factor favoring continued operation at 850 nm.

Fiber loss in the domain is 2–5 dB/km. Such "intrabuilding" LANs, while of short path length—$\leqq 500$ meters—may require multiple splices or connectors to facilitate placement and configuration/reconfiguration of the network. Splices and connectors are known to generate backscattered power back toward the source. This is a particular problem under circumstances otherwise favoring Duplex operation. In such systems providing for bi-directional communication within a single fiber, such backscattering may result in erroneous information being introduced on a receiver from a transmitter at the same end of the transmission line. A system solution, based on the broad wavelength range of EMF, takes the form of Diplex operation, providing for different wavelength transmission in the two directions (as accommodated by use of a power-splitting, wavelength selective device). An exemplary system may separate the two "extreme" wavelengths by 25 nm or more.

High per-channel bandwidth performance of EMF—performance to about 10 gigabit over the entire range of 770–1700 nm—tends to facilitate per-fiber, bi-directional operation in another manner. Reduction in number of required channels for given capacity, is yet another factor permitting increased channel-to-channel spacing, thereby lessening needed wavelength selection and so resulting in lower device cost. Alternatively, use of higher-selectivity devices with expanded operating wavelength capability may result in increased capacity at the same per-channel cost.

It is anticipated that the bandwidth/loss characteristics of EMF will result in its use in interbuilding LANs. Such systems will differ from initially installed intrabuilding systems by provision for operation at longer wavelength accommodating the longer transmission distances. Likely multichannel, such interbuilding LANs may be based on either unidirectional or bi-directional per-fiber operations.

The Drawings

Contemplated systems are considered in conjunction with the figures.

As with fundamentals of system design, detailed discussion of device design is not considered within the province of this discussion. Instead, reliance is had on state-of-the-art knowledge as illustrated by:

*Fundamentals of Photonics,* B. E. A. Saleh and M. C. Teich, Wiley Interscience 1994: transmitter design starting at p. 592; receiver design starting at p. 644; multiplexer/demultiplexer design starting at p. 890); optical amplifier design starting at p. 460.

FIG. 1

The Simplex system of FIG. 1 is shown as consisting of two oppositely-transmitting unidirectional spans: the first constituted of transmitter 10, transmission line 11, and receiver 12, providing for left-to-right transmission; and the second constituted of transmitter 13, transmission line 14, and receiver 15, providing for right-to-left transmission. Transmission lines 11 and 14 are of Enhanced Multimode Fiber. For intrabuilding usage, spans depicted are, illustratively, 300–500 meters in length. Consistent with state-of-the-art intrabuilding LANs, operation is likely at nominal wavelength of 850 km, as permitted with EMF. System parameters—unamplified span lengths $\leq 500$ meters, $\lambda_s = 850$ nm—permit WDM operation at bit-rate $\geq 10$ gigabit/channel, or single channel operation at bit-rate $\geq 20$ gigabit. FIG. 1, like other figures, are simplistic—e.g., do not show possible amplifiers and likely splice points. Contemplated circuitry provides well for all such, and other, variations—if only in provision of large channel-separation as permitted for considerable operating wavelength range of EMF, thereby reducing deleterious effect of signal reflections. Similarly, FIG. 1 may be viewed as a first span of a multispan system.

Viewed as an interbuilding, Enterprise system—likely of span length of 1–10 km—operating wavelength will usefully be shifted to lower-loss, longer wavelength, perhaps at nominal value, $\lambda_s = 1310$ nm. A variety of considerations, including ongoing work, suggest selection of a system wavelength in the range, 1000–1700 nm.

FIG. 2

Figure 2:
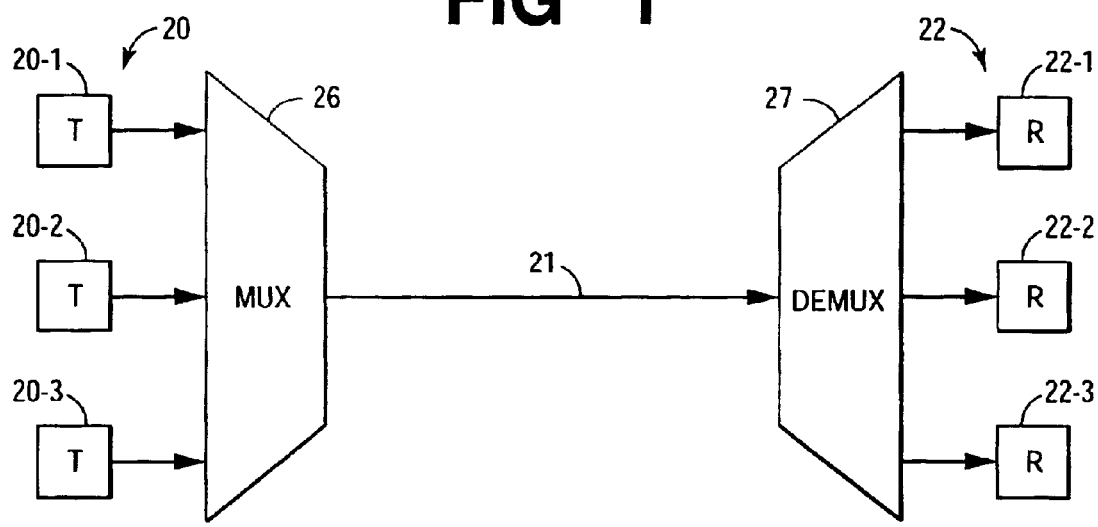
FIG. 2 is a schematic diagram of a Simplex system of the invention, now providing for CWDM operation on each of the two fibers.
Figure 2:
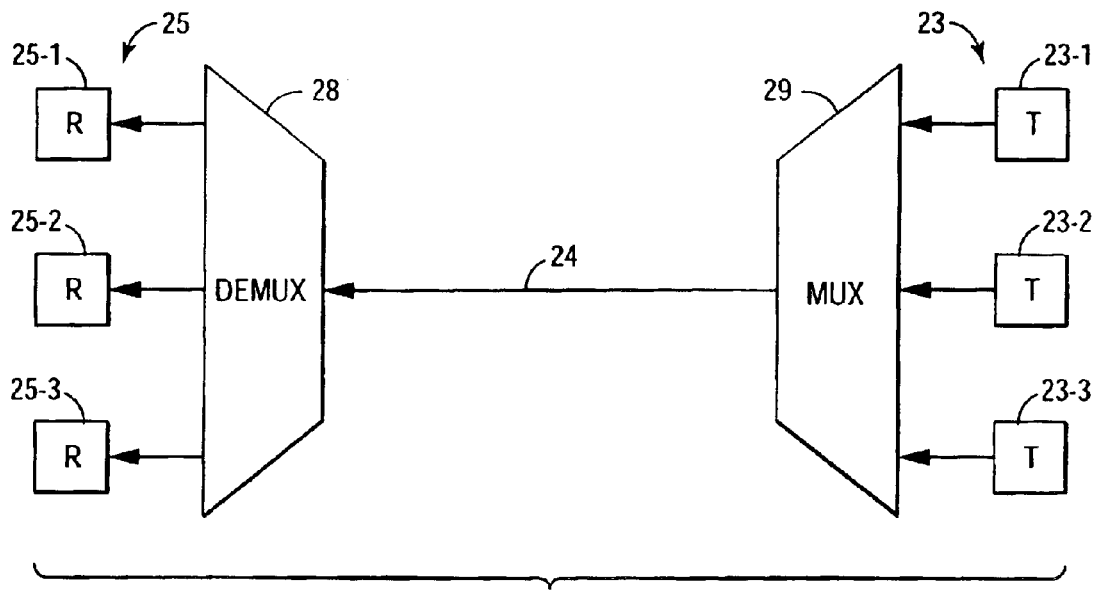
Figure 3:
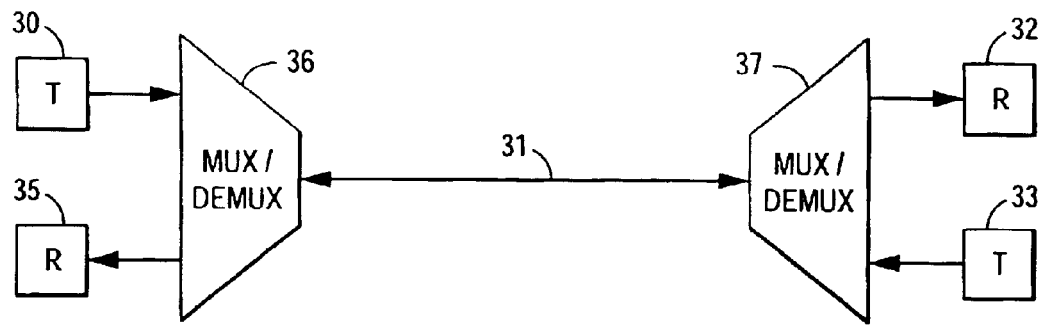
FIG. 3 is a circuit diagram of a Duplex system, accordingly providing for bidirectional transmission on a single fiber.
Figure 4:
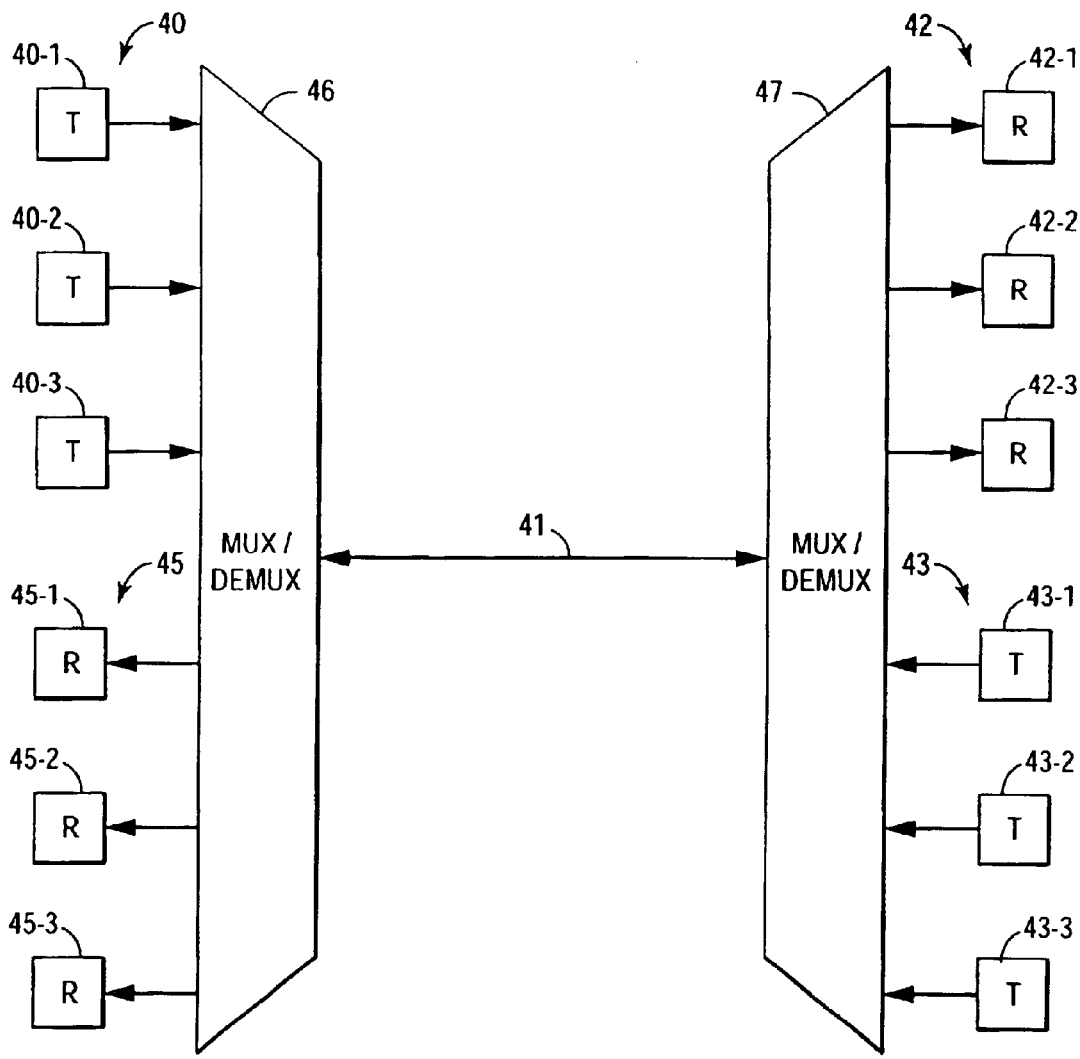
FIG. 4 is a diagram for a Duplex system providing for multichannel signal transmission in each direction.

The Simplex system of FIG. 2 differs from that of FIG. 1 in explicitly providing for WDM operation. It, too, consists of two oppositely-transmitting unidirectional spans: the first including transmitting means 20, EMF transmission line 21, and receiving means 22, providing for left-to-right transmission; and the second including transmitting means 23, EMF transmission line 24, and receiving means 25, providing for right-to-left transmission. Multiplexers 26, 29 and demultiplexers 27, 28 complete the system as shown.

WDM operation is illustrated as providing for a 3-channel set, so that: transmitting means 20 and 23 are shown as constituted of channel transmitters 20-1, 20-2, 20-3, and 23-1, 23-2, 23-3 respectively; and receiving means 22 and 25 as constituted of channel receivers 22-1, 22-2, 22-3, and 25-1, 25-2, 25-3 respectively. While 3-channel, or even 2-channel WDM is not precluded—might be desirable for satisfying sometimes-limited LAN demands—a valuable aspect of the invention concerns greater capability due to broad wavelength operating range of EMF, so that channel sets of from 4-member through 10-member and greater are contemplated. With today's technology, a wavelength range of 930 nm is realizable for the 770–1700 nm total band encompassing the nominal system wavelengths, 850 nm, 1310 nm, 1550 nm. In terms of likely CWDM operation, at a common channel-to-channel spacing $\geq 10$ nm, this suggests a channel set of 94 members. This capability is generally represented, in discussion and claims, in terms of spacing of "extreme" members of the system (e.g. spacing $\geq 25$ nm)—by which is intended the wavelength spacing between the least-wavelength member and greatest-wavelength member, e.g., of a WDM channel set. The same afforded separation is expedient for Diplex as well as Simplex operation, and is valuably assigned to oppositely-directed as well as to same-directed channels.

Mode-dispersion, now lessened through contributions: α-profiling for lessening differences in group velocities for the various supported modes; and perturbation-induced mode mixing for "averaging out" remaining differences, permits state-of-the-art 10 gigabit/channel over a broadened bandwidth, with total capacities generally unattainable in multimode operation. This applies equally well for oppositely-directed as for same-directed channels. It applies, too, to TDM, in which one-channel, 20 gigabit operation translates, e.g., into two channels, each providing for 10 gigabit capability.

Emphasis on coarse channel separation is with a view to likely utilization of broad wavelength operating range, and it is this capability that underlies basis for most serious competition to LANs based on single-mode, DWDM operation. Nevertheless, channel-to-channel spacings<10 nm, until now unfamiliar for multimode operation, are not discounted.

FIG. 3

The system depicted provides for Duplex operation over a single EMF transmission line 31. Transmitter 30 and receiver 32 provide left-to-right communication: transmitter 33 and receiver 35 provide right-to-left communication. Each of circuit elements 36 and 37 operates to assure separation of oppositely-directed channels—on basis of wavelength-selection or power-splitting.

FIG. 4

The Duplex system shown provides, as well, for WDM operation in both directions. This figure bears the same relation to FIG. 3 as FIG. 2 to FIG. 1, and, for the most part, the same considerations apply. Elements 46 and 47 perform necessary splitting and multiplexing/demultiplexing functions for accommodating bidirectional WDM communication over EMF 41. The system is completed with: transmitting means 40 and 43, constituted of units 40-1,40-2, 40-3 and 43-1, 43-2, 43-3, respectively; and receiving means 42 and 45, constituted of units 42-1, 42-2, 42-3 and 45-1, 45-2, 45-3, respectively.

Other Matters

General comments made with regard to specific systems shown in the figures, apply to other systems as well. These include description of likely LAN characteristics, e.g., span length, system wavelength/s, channel separation, and bit rate. More complex systems might include successive spans and/or additional elements as for optical amplification.

What is claimed is:

1. Multimode, optical fiber, local area network system including transmitter means, receiver means, and a transmission line, the transmitter means performing functions including generating optical signal and modulating such signal for introduction into the transmission line, the signal being at system wavelength within the wavelength range of 770–1700 nm,

CHARACTERIZED IN THAT the said transmission line includes at least one fiber span comprising "Enhanced Multimode Fiber" ("EMF"), said EMF having a core that is: of profiled index-of-refraction for lessening difference in group velocity for supported modes, and said EMF also being provided both: with a longitudinally-spaced series of perturbations for promoting mode coupling as among bound modes, thereby further lessening mode dispersion; and with a radially-positioned core discontinuity in index-of-refraction for discouraging mode coupling between bound and cladding modes, thereby lessening added loss associated with the series of perturbations, and in that the said signal, as introduced into the said EMF, includes two "extreme" channel signals of differing wavelengths spaced by at least 25 nm.

2. System of claim 1 in which the said extreme channel signals are oppositely directed.

3. System of claim 1, providing for per-channel capacity of at least 10 gigabit for each of the said extreme channel signals.

4. System of claim 1, providing for WDM operation including a plurality of channels of spaced wavelengths intermediate those of the extreme channels.

5. System of claim 4, in which channels are at spacing≧10 nm.

6. Simplex system of claim 5, providing for a WDM channel set of at least 10 channels.

7. System of claim 6, providing for a per-channel capacity of at least 10 gigabit for each of 10 channels of the WDM set.

8. System of claim 1, providing for at least one channel of 850 nm nominal wavelength.

9. System of claim 8, providing for transmission of unamplified signal over fiber length of at least 300 meters.

10. System of claim 9, providing for transmission of unamplified signal over fiber length of at least 400 meters.

11. System of claim 1, providing for at least one channel of wavelength in the range of 1000–1700 nm.

12. System of claim 11, providing for transmission of unamplified signal over fiber length of at least 1 kilometer.

13. Multimode, optical fiber, local area network system including transmitter means, receiver means, and a transmission line, the transmitter means performing functions including generating optical signal and modulating such signal for introduction into the transmission line, the signal being at system wavelength within the wavelength range of 770–1700 nm,

CHARACTERIZED IN THAT the said system includes at least one span including at least one "Enhanced Multimode Fiber" ("EMF"), having a core provided both: with a longitudinally-spaced perturbation stream for promoting mode coupling as among bound modes, thereby lessening mode dispersion; and with a radially-positioned discontinuity in index-of-refraction for discouraging mode coupling between bound and cladding modes, thereby lessening added loss associated with the perturbation stream, and in that the said signal includes at least one channel of 20 gigabit/sec capacity.

* * * * *